United States Patent [19]

Engelke et al.

[11] Patent Number: 4,777,469

[45] Date of Patent: Oct. 11, 1988

[54] PUBLIC TERMINAL RECEPTACLE

[75] Inventors: Robert M. Engelke, Madison; Rodney D. Borst, Oregon; Kevin Colwell, Madison, all of Wis.

[73] Assignee: Ultratec, Inc., Madison, Wis.

[21] Appl. No.: 74,625

[22] Filed: Jul. 17, 1987

[51] Int. Cl.⁴ .......................................... H04M 11/00
[52] U.S. Cl. ........................................ 379/96; 379/52; 379/143; 379/437
[58] Field of Search ................ 379/52, 96, 97, 98, 379/99, 143, 144, 145, 153, 155, 368, 433, 435, 437, 454, 451, 453; 340/825.19

[56] References Cited

U.S. PATENT DOCUMENTS

| D. 280,099 | 8/1985 | Topp ............................. 379/52 |
| 3,372,246 | 8/1964 | Knuepper ..................... 379/368 |
| 3,585,303 | 6/1971 | Chieffo . |
| 3,598,920 | 8/1971 | Fischer . |
| 3,800,089 | 3/1974 | Reddick . |
| 3,896,267 | 7/1975 | Sachs et al. . |
| 3,959,607 | 5/1976 | Vargo ............................. 379/453 |
| 4,012,599 | 3/1977 | Meyer . |
| 4,037,067 | 7/1977 | Solomovitz . |
| 4,039,768 | 8/1977 | O'Maley . |
| 4,151,380 | 4/1979 | Blomeyer et al. ............ 379/439 |
| 4,160,136 | 7/1979 | McGough . |
| 4,191,854 | 3/1980 | Coles . |
| 4,254,308 | 3/1981 | Blomeyer et al. . |
| 4,268,721 | 5/1981 | Nielson et al. . |
| 4,307,266 | 12/1981 | Messina ......................... 379/96 |
| 4,426,555 | 1/1984 | Underkoffler . |
| 4,471,165 | 9/1984 | DeFino et al. ................. 379/96 |
| 4,533,791 | 8/1985 | Read et al. .................... 379/96 |
| 4,568,803 | 2/1986 | Frola ............................. 379/155 |
| 4,650,927 | 3/1987 | James . |

FOREIGN PATENT DOCUMENTS

| 2403697 | 4/1979 | France ........................... 379/454 |
| 2432805 | 2/1980 | France ........................... 379/454 |
| 2538978 | 7/1984 | France ........................... 379/144 |
| 2647097 | 4/1978 | Fed. Rep. of Germany ...... 379/454 |
| 3410619 | 10/1985 | Fed. Rep. of Germany ........ 379/52 |

Primary Examiner—Gerald L. Brigance
Assistant Examiner—Mahmoud Fatahi-Yar
Attorney, Agent, or Firm—Isaksen, Lathrop, Esch, Hart & Clark

[57] ABSTRACT

A public terminal receptacle for containing, protecting, and allowing a user access to a computer terminal, telecommunications device for the deaf, or another type of terminal which is telephonically linked and physically adjacent to a public telephone through which the terminal may telecommunicate with other electronic devices. The public terminal receptacle includes a housing having an opening and which is adapted to be attached to a public telephone booth, a drawer which is slidably mounted within the housing to move between a closed position where the drawer is within the housing and an open position where at least a forward portion of the drawer extends out through the opening, the terminal, and a motor drive system mounted within the housing and which is drivingly connected to the drawer for opening and closing the drawer in response to specific electrical signals. The drawer is adapted to contain a terminal and has a keyboard opening through which a user can have physical access to the keyboard on the terminal. The public terminal receptacle is armored to protect the terminal from vandalism. Specific electronic signals can be sent from the public telephone to the motor to open the drawer in a variety of ways.

18 Claims, 3 Drawing Sheets

PUBLIC TERMINAL RECEPTACLE

BACKGROUND OF THE INVENTION

1. Field of the Invention

The present invention relates to devices which are used for storing, protecting, and allowing user access to telecommunications devices for the deaf or for computer access, and in particular, to those devices which are used when a telecommunications device for the deaf or a computer access terminal is connected to a public telephone.

2. Description of the Prior Art

Computer terminals or telephone terminals for the deaf (TDD) are often connected to a telephone line through a modem which allows the computer terminal to transmit digital information over a telephone line to another electronic device which is connected to the telephone line through another modem. Telecommunications devices for the deaf, or TDDs, exist which also can be connected to telephones to transmit graphic or written conversation over the telephone line to another telecommunications device for the deaf which receives the message and either displays it on a display or monitor or prints out the message on paper or both. Such computer terminals and telecommunications devices for the deaf are most often connected to telephone lines which are not generally accessible to the public. However, with the increased public use and awareness of computers, there is an increased need for public access to computer terminals in general. In addition, greater efforts are being made to provide services to handicapped individuals which heretofore were not available, such as use of public pay phones. If display terminals were simply added to public pay telephones, though, the terminals could be destroyed easily by vandals, or damaged by the weather.

SUMMARY OF THE INVENTION

The present invention is summarized in that a public terminal receptacle for containing, protecting, and allowing user access to a terminal which is telephonically linked and physically adjacent to a public telephone through which the terminal may telecommunicate with other electronic devices comprises a housing which is adapted to be attached to a public telephone booth, the housing having an opening, a drawer which is slidably connected to the housing to move through the opening between a closed position and an open position, a terminal housed in the drawer, and a motor drive system which is mounted within the housing and is drivingly connected to the drawer for opening and closing the drawer in response to specific electrical signals. The drawer in its closed position is contained within the housing, and in its open position has a forward portion of the drawer extending out through the opening. The drawer is adapted to contain the terminal which has a keyboard and a display. The drawer includes a cover which extends between sides of the drawer in a forward portion of the drawer to cover a forward portion of the terminal which includes the keyboard and the display. The cover forms a keyboard opening through which the user can have physical assess to the keyboard on the terminal. The cover is made from a transparent material through which the display may be read by the user.

The motor drive system preferably includes a reversible stepping motor which is mounted to a side of the drawer on a rear portion of the drawer in a space formed by the housing to one side of the drawer, and a screw shaft which the motor utilizes to drive the drawer between its open and closed positions. Preferably the motor turns in a forward direction to open the drawer and a reverse direction to close the drawer. Alternatively other equivalent motor drive systems could be utilized, such as cable or hydraulic drive systems which would open and close the drawer.

A primary object of the invention is to provide a public terminal receptacle which provides protection from vandalism and from the elements to the terminal contained therein.

A second object of the invention is to provide a public terminal receptacle which provides access to the terminal for a selected segment of the population.

An additional object of the invention is to provide a public terminal receptacle which opens automatically in response to specific electronic signals to allow access to the terminal.

A further object of the invention is to provide a public terminal receptacle which opens automatically to allow user access to the terminal when a special credit card is inserted into the connected public telephone.

Another object of the invention is to provide a public terminal receptacle which opens automatically to allow access to the terminal in response to specific touch-tone key sequences.

Yet an additional object of the invention is to provide a public terminal receptacle which opens automatically to allow access to the terminal in response to an electronic signal received by the public telephone to indicate that the electronic device at the other end of the telephone line has answered the call.

Yet a further object of the invention is to provide a public terminal receptacle which contains a terminal which is telephonically linked to and used in conjunction with the public telephone.

Other objects, features, and advantages of the invention will be apparent from the following detailed description taken in conjunction with the accompanying drawings wherein a preferred embodiment of the invention has been selected for exemplification.

DESCRIPTION OF THE PREFERRED EMBODIMENT

Figure 1:
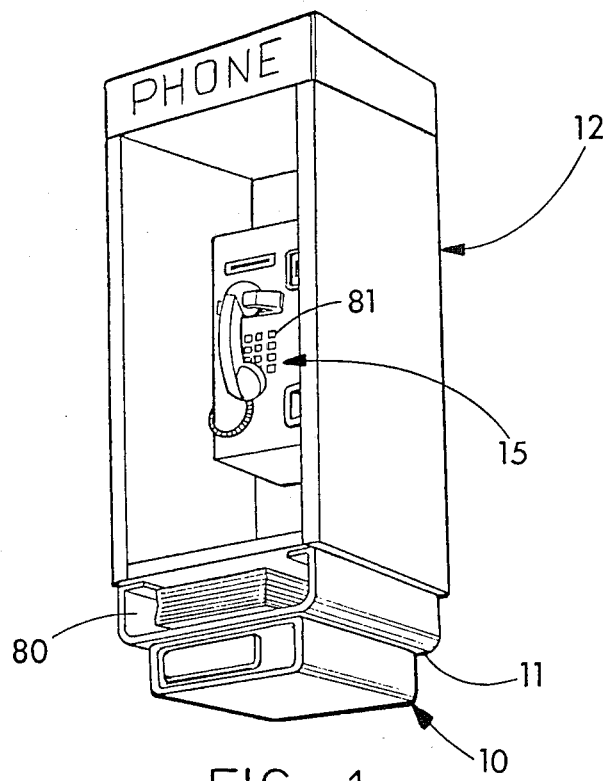
FIG. 1 is a perspective view of a public telephone booth having the public terminal receptacle connected to and located at the bottom of the booth.
Figure 2:
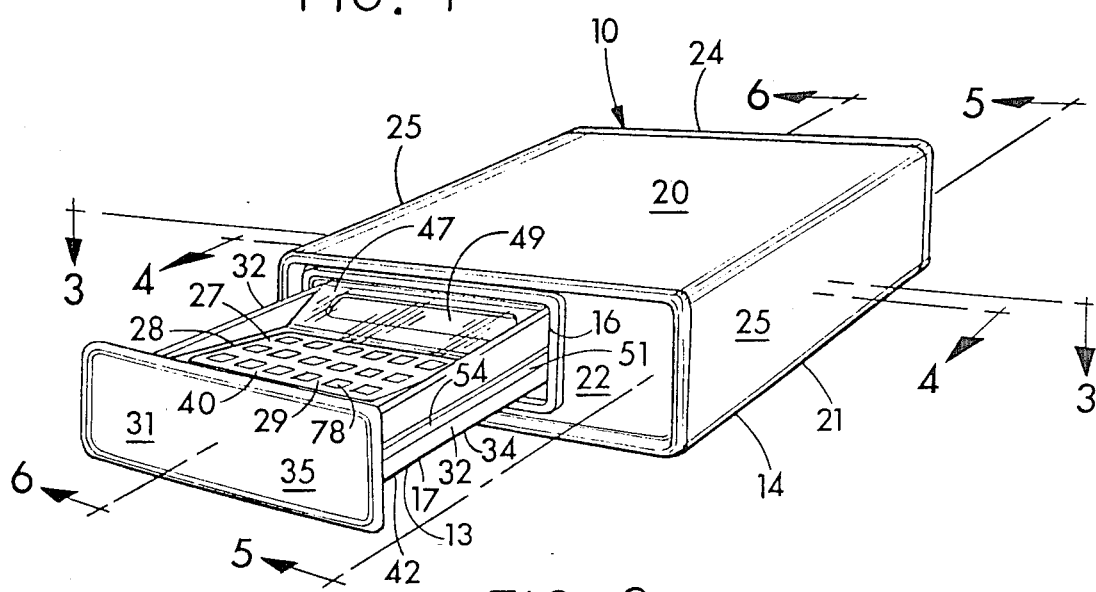
FIG. 2 is a perspective view of the public terminal receptacle of the present invention showing the drawer in its opened position with the terminal contained therein accessible to the user.
Figure 3:
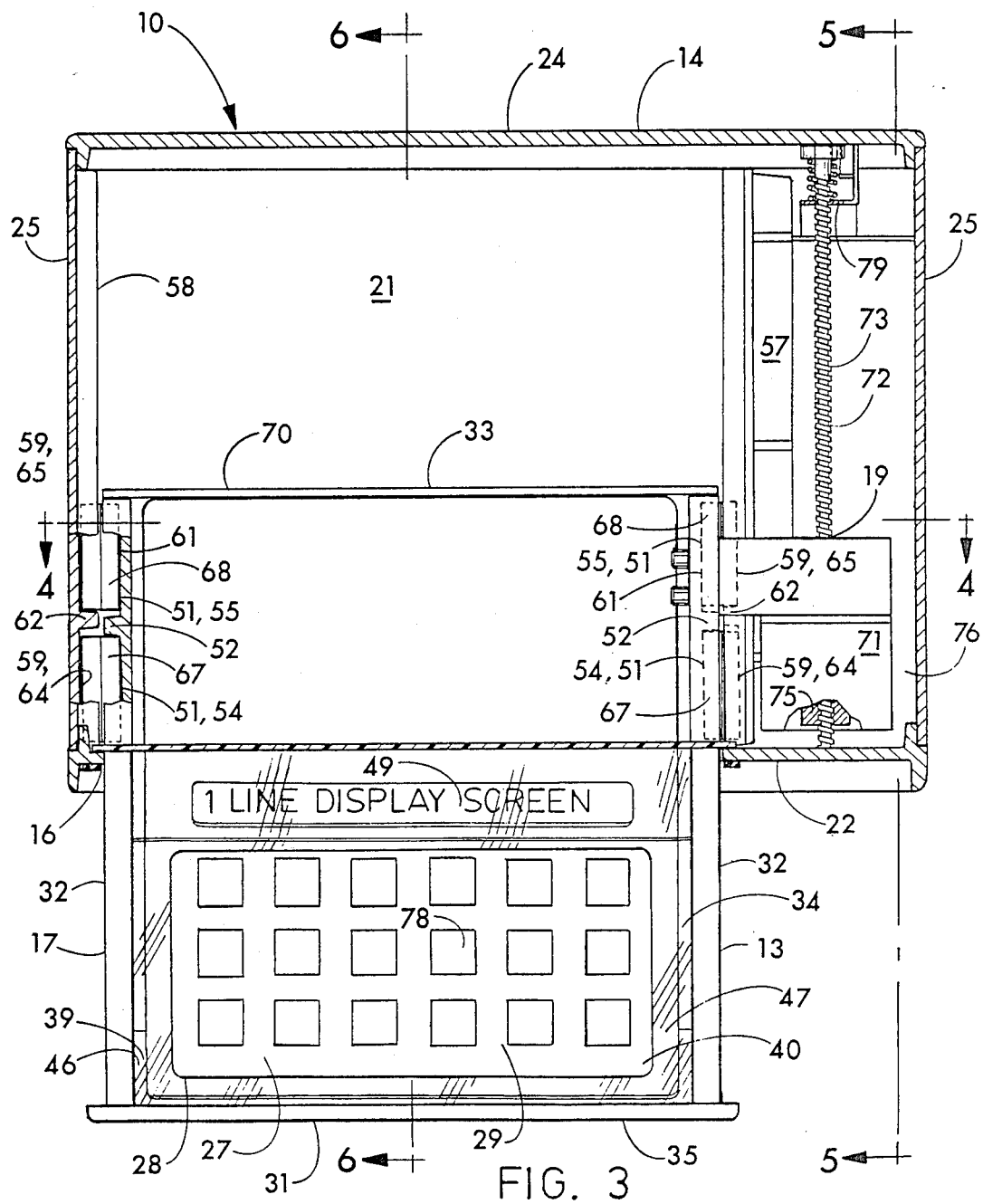
FIG. 3 is a top plan section view taken along section line 3—3 of FIG. 2.

Referring more particularly to the drawings, wherein like numbers refer to like parts, FIG. 1 shows a public terminal receptacle 10 attached to the bottom 11 of a public telephone booth 12. FIG. 2 shows the public terminal receptacle 10 alone with its drawer 13 in the open position. As shown in FIGS. 2 and 3, the public terminal receptacle 10 includes a housing 14 with an opening 16. The housing 14 is adapted to be attached to the public telephone booth 12. A drawer 13 is slidably mounted within the housing 14 to move between a closed position, where the drawer 13 is contained in the housing 14, and an open position where the front portion 17 of the drawer 13 extends out through the opening 16. A motor drive system 19 is mounted within the housing 14 and is connected so as to be able to drive the drawer 13 for opening and closing the drawer 13 in response to specific electrical signals. As shown in FIGS. 2-6, the housing 14 includes a top 20, a bottom 21, a housing front 22 which forms the opening 16 for the drawer 13, a rear 24, and two sides 25 which are joined together to form the housing 14 into a rectangular shape. The top 20, the bottom 21, the housing front 22, the rear 24, and the two sides 25 preferably are formed from metal plates which make it difficult for a vandal to tamper with the public terminal receptacle 10.

Figure 5:
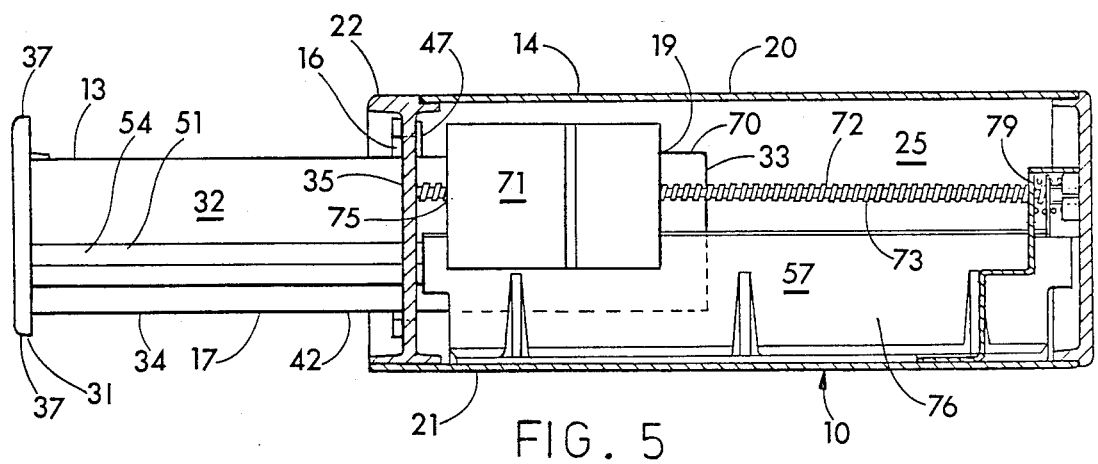
FIG. 5 is a section view taken along section line 5—5 of FIG. 2.
Figure 6:
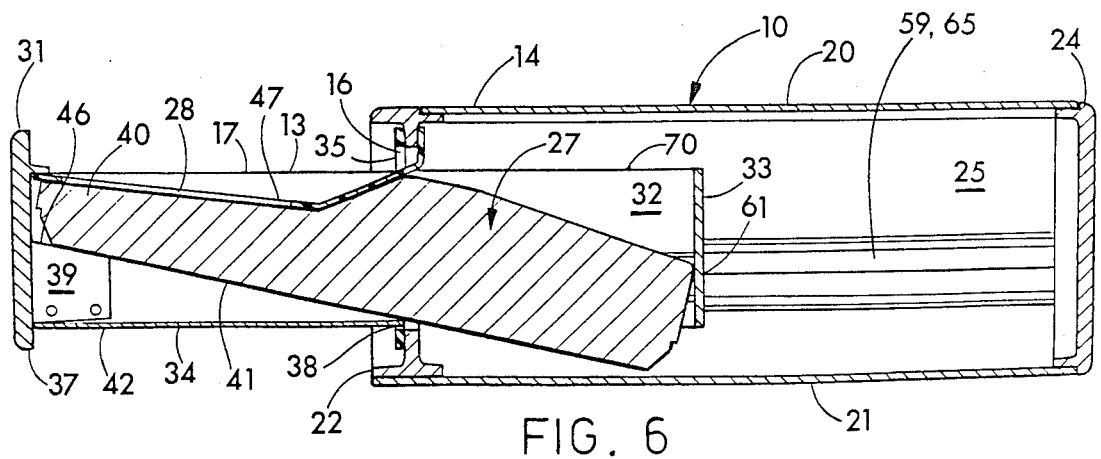
FIG. 6 is a section view taken along section line 6—6 of FIG. 2.

As shown in FIGS. 3 and 6, the drawer 13 is adapted to contain the terminal 27, and has a keyboard opening 28 through which the user can have physical access to a keyboard 29 on a terminal 27, when the drawer 13 is in its open position. The terminal could be either a computer terminal, a telecommunications device for the deaf, or any other type of telecommunications terminal which is adapted for general telephone access. The drawer 13 includes a drawer front 31, two side panels 32, a drawer bottom 34, and a back 33 which are joined together to form a rectangular frame as shown in FIGS. 3-6. The drawer front 31, and two side panels 32 are preferably formed from cast metal plate. The drawer front 31 overlaps a front face 35 of the housing 14 in proximity to the opening 16, when the drawer is closed, to help prevent vandals from being able to pry between the drawer front 31 and the housing front 22. As shown in FIG. 6, the drawer front 31 includes a rest 39, which extends rearwardly between the side panels 32 in the forward portion 17 of the drawer 13 which extends outside of the housing 14 when the drawer 13 is in its open position. The rest 39 has a surface 46 which is inclined downwardly in a rearward direction to support a forward portion 40 of the terminal 27 so that the bottom 41 of the terminal 27 is inclined downwardly. The drawer bottom 34 extends rearwardly from the drawer front 31 between the lower edges 42 of the side panels 32 in the forward portion 17 of the drawer 13. The back edge 37 of the drawer bottom 34 supports the bottom 41 of the terminal 27 as shown in FIG. 6. The back 33 of the drawer 13 prevents the terminal 27 from slipping rearwardly. The dimensions of the drawer 13 are thus specifically selected to conform to the size and shape of the terminal 27.

The drawer 13 furthermore includes a cover 47 which extends rearwardly from the drawer front 31 between the side panels 32 in the forward portion 17 of the drawer 13 as shown in FIGS. 3 and 6. The cover 47 is adapted to cover the forward portion 40 of the terminal 27 both to protect and to prevent theft of the terminal 27. The cover 47 has formed in it the keyboard opening 28, which allows the user access to the terminal keyboard 29 when the drawer 13 is in its open position. Preferably the cover 47 is adapted to extend over a display 49 on the terminal 27 and is formed from a transparent material, such as the polycarbonate resin sold under the trademark "Lexan." The display 49 then can be viewed by the user through the cover 47 when the drawer 13 is in its open position. The terminal 27 may include a one-line display 49, as illustrated in FIG. 49, or may include a multi-line display or a CRT monitor, and the terminal 27 may alternately or additionally include a printer to provide a paper print-out of messages received.

Figure 4:
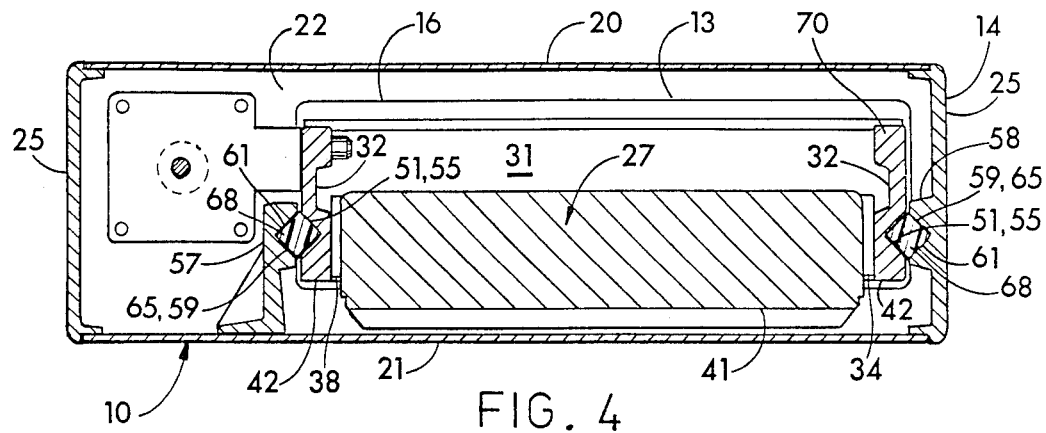
FIG. 4 is a section view taken along section line 4—4 of FIG. 2.

The two side panels 32 of the drawer 13 each have an outwardly opening preferably V-shaped channel 51 which extends between drawer front 31 and the back 33 of the drawer 13 as shown in FIGS. 2-5. The drawer side panels 32 further include a drawer bearing stop 52 which extends vertically in the channel 51 to divide that channel 51 into a large front part 54 and a small back part 55 as shown in cut-away section view in FIG. 3. The housing 14 includes two members 57 and 58 which each form a preferably V-shaped channel 59 that extends between the housing front 52 and the rear 24 of the housing 14 and opens adjacent to and toward the corresponding drawer channel 51 as shown in FIGS. 3-4 and 6. Each drawer channel 51 and its corresponding housing channel 59 are a pair of opposed channels which together form a narrow space 61 therebetween. The housing members 57 and 58 each further include a housing bearing stop 62 which each extends vertically in one channel 59 to divide that channel 59 into a small front part 64 and a large rear part 65 as shown in cut-away section view in FIG. 3. The public terminal receptacle 10 furthermore includes two front bearings 67 and two rear bearings 68 which are located in the two narrow spaces 61 formed by the opposed drawer channels 51 and housing channels 59. A front bearing 68 is maintained in the small front part 64 of each of the two housing channels 59. Each front bearing 67 extends into the large front part 54 of the adjacent drawer channel 51. A the drawer 13 opens and closes, these two front bearings 68 are maintained by the housing bearing stops 62 near the housing front 22 to support the drawer 13 as the drawer channels 51 move over the front bearings 67. Each drawer bearing stop 52 maintains a back bearing 68 within the small back part 55 of each housing channel 59. Each of the two back bearings 68 extend from a drawer channel small back part 55 into the adjacent housing channel large rear part 65. The two drawer bearing stops 52 maintain the two back bearings 68 near the back 33 of the drawer 13 to support the back portion 70 of the drawer 13. As the drawer 13 opens and closes, the two back bearings 68 move forwardly and rearwardly within the housing channel large rear part 65. By using a front bearing 67 and a back bearing 68 to support each side panel 32 of the drawer 13, the four bearings 67 and 68 give the drawer 13 stable support. Preferably the bearings 67 and 68 are made with high density polyethylene which has high lubricity.

The motor drive system 19 preferably includes a reversible stepping motor 71 which rotates in a forward direction to open the drawer 13 and in a reverse direction to close the drawer 13, and a force transmission system 72 which is utilized by the motor 71 to apply force to the drawer 13 to move the drawer 13 between its open and closed positions. As shown in FIGS. 3-5, the force transmission system 72 includes a screw shaft 73 which is engaged by the motor 71 to open and close the drawer 13. The motor 71 has a hollow internally threaded shaft 75 and is mounted to the right side panel 32 of the drawer 13 on a back portion 70 of the drawer 13 in a space 76 formed by the housing to the right side of the drawer 13. The screw shaft 73 is fixedly mounted to the rear 24 of the housing 14 and extends forwardly an entire length of the space 76 through the threaded motor shaft 75 to the housing front 22. As the motor operates, the threaded motor shaft 75 shown in FIG. 3 rotates over the screw shaft 73 to move the motor 71 forwardly and rearwardly over the screw shaft 73 to thereby open and close the drawer 13. Although this is the preferred embodiment, alternatively the motor shaft could be a screw shaft which rotates within an internally threaded element connected to the drawer 13 to open and close the drawer 13. The system 19 could be built so that a reversible motor is unnecessary. Additionally, other alternative embodiments might use some form of pulley and cable arrangement to open and close the drawer 13, and yet would not depart from the spirit of this invention. Other equivalent force transmission systems could also be used such as those which utilize gears or hydraulic pistons to transmit force.

The receptacle 10 as shown in FIG. 1 is attached to the bottom 11 of a public telephone booth 12. Alternatively, the receptacle 10 could be attached elsewhere, such as in the telephone book space 80. Preferably the terminal 27 and receptacle 10 are connected directly to the phone line and electrical power line with either internal, hidden wiring or with armored conduit. Although much of the receptacle 10 is made from metal plate, it could be made with other materials which would afford similar protection to the terminal 27.

It is to be understood that the arrangement of the parts of the public terminal receptacle 10 may have to be varied somewhat depending on the shape and size of the case of the public telephone booth 12. For example, in many applications it may be more appropriate to house the motor drive system 19 underneath, rather than by the side of, the drawer 13. The receptacle would still function in the same manner in such a configuration but it would simply not be as wide in physical space.

The public terminal receptacle 10 includes several features which in combination with the terminal 27 and public telephone 15 serve to control the operation of the public terminal receptacle 10. The public terminal receptacle 10 may include a timer which, after telecommunications have ceased for a selected length of time, sends a signal which activates the motor 71 to rotate in its reverse direction and thereby close the drawer 13. Whenever the user presses a terminal key 78, the timer is reset to zero so that the countdown for the selected length of time starts over again. Thus a user may delay the closing of the drawer 13 by simply pressing a terminal key 78. Even if the drawer 13 is already closing, and any terminal key 78 is pressed, the timer (not shown) is reset to zero and a signal is sent to the motor 71 to re-open the drawer 13. The more usual method to initiate closure of the drawer 13, however, would be detection of the loss of the modem carrier signal from the station called, indicating an end to data transmission. The public terminal receptacle 10 also includes a limit switch 79 which is contacted and thereby opened when the drawer 13 reaches its closed position. This limit switch 79 is shown most clearly in FIGS. 3 and 5. When the limit switch 79 is contacted and opened, the motor 71 is shut off so that the motor 71 does not strain to attempt to close the drawer 13 past its closed position. When the drawer 13 is opening, the drawer 13 eventually reaches its fully open position where it is blocked from opening any more by the back bearings 68 pressing against the housing bearing stops 62 and also by the drawer bearing stops 52 pressing against the front bearings 67 as shown in FIG. 3. At this point, the motor 71 draws more current in an attempt to move the drawer 13 still further forwardly. Therefore, the public terminal receptacle includes a current sensor (not shown) which senses an increased current flow to the motor 71 and shuts the motor 71 off when the drawer 13 reaches its open position. The controls for the motor 71 may also include a generalized current sensor responsive to current draw of the motor, or a spring-loaded motor torque sensor, to sense any jam of the drawer 13, as might occur if fingers were caught in the drawer 13, to cease motor operation if a jam were to occur.

The public terminal receptacle 10 is preferably telephonically linked to the public telephone 15 so that when a call is made to another telephone having an electronic device which communicates back an answer signal, an electronic signal activates the motor 71 to open the drawer 13. The electronic signal to activate the motor would normally be initiated by the detection of a modem signal of appropriate frequency from the other telephone. Alternatively, the public terminal receptacle 10 may be telephonically linked to the public telephone 15 so that when a user presses a selected touch-tone telephone key 81 sequence on the public telephone 15, an electronic signal activates the motor 71 to open the drawer 13. The public terminal receptacle 10 may also be telephonically linked to the public telephone 15 so that when a user inserts a special type of credit card into the telephone 15, an electronic signal activates the motor 71 to open the drawer 13. Another alternative is to provide a public telephone with no voice handset at all, but which is a stand-alone public access terminal.

In its operation and use, the public terminal receptacle 10 is intended to house, protect and allow public access to a terminal 27 which may either be a computer terminal or a telecommunications device for the deaf, or some other type of terminal. The user may cause the drawer to open in as many as three different ways. First, the user may open the drawer 13 by inserting into the public telephone 15 a special credit card which causes an electronic signal to activate the motor 71 to open the drawer 13. These special credit cards may be distributed to hearing impaired individuals using telecommunications devices for the deaf, or to other authorized persons who are allowed access to the contained computer terminal or other type of terminal. Secondly, the user may activate the motor 71 to open the drawer 13 by making a call on the telephone 15 to another telephone having an electronic device which communicates back an answer signal. When the answer signal is received, an electronic signal activates the motor 71 to open the drawer 13. Thirdly, the user may open the drawer 13 by pressing a selected touch-tone key 81 code sequence on the telephone 15 which causes an electronic signal to activate the motor 71.

Once activated, the motor 71 turns in a forward direction over the screw shaft 73 to drive the drawer 13 forwardly to its open position. When the drawer 13 reaches its open position, the motor 71 strains and draws an increased amount of current in an attempt to continue to open the drawer even further. The current sensor (not shown) senses this increased current draw and shuts off the motor 71. At this point, the user can reach his/her fingers in through the keyboard opening 28 in the cover to press the terminal keys 78 and thereby transmit the desired communications. After the communication has ceased, either party can break communications and the carrier signals between the two stations will cease. The motor control would then respond to the loss of carrier to initiate closure of the drawer 13. If while the drawer 13 is closing, the user desires to have the drawer 13 reopen, the user may do so by pressing any key 78 on the terminal 27.

The public terminal receptacle 10 allows user access to telecommunication devices for the deaf, computer terminals, and other types of terminals in areas where there is a public telephone 12. The public terminal receptacle is connected directly to the public telephone 15, yet does not interfere with the normal use of the public telephone 15. When a terminal 27 is placed within the receptacle 10, the terminal is hidden from sight so that vandals will not know what is inside the receptacle 10. Even if vandals do know the contents of the receptacle 10, the receptacle 10 is armored on all sides so that it is difficult to break into. Furthermore, the public terminal receptacle 10 provides protection to the terminal 27 from the elements. Even when the drawer 13 is in its open position, the terminal 27 is protected by the cover 47 so that vandalism and theft will be minimized.

It is to be understood that the present invention is not limited to the particular arrangement and embodiments of parts disclosed and illustrated herein, nor to the materials specified, but embraces all such modified forms thereof as come within the scope of the following claims.

What is claimed is:

1. A public terminal receptacle for containing, protecting, and allowing a user access to a terminal which is telephonically linked and physically adjacent to a public telephone through which the terminal may telecommunicate with other electronic devices, the public terminal receptacle comprising:
   a. a tamper-resistant housing which is adapted to be attached to a public telephone booth, the housing having an opening;
   b. a drawer which is slidably mounted within the housing to move between a closed position where the drawer is within the housing and an open position where at least a forward portion of the drawer extends out through the opening;
   c. a terminal housed in the drawer and accessible to a user when the drawer is in the open position; and
   d. a motor drive system which is mounted within the housing and is drivingly connected to the drawer for opening and closing the drawer in response to specific electronic signals, the motor drive system including a motor and a force transmission system which is utilized by the motor to apply force to the drawer to move the drawer between its open and closed positions.

2. The public terminal receptacle of claim 1 wherein the motor is a reversible stepping motor which rotates in one direction to open the drawer, and in an opposite direction to close the drawer.

3. The public terminal receptacle of claim 2 wherein the force transmission system includes a screw shaft which is engaged by the motor to open and close the drawer.

4. The public terminal receptacle of claim 3 wherein the motor has a hollow internally threaded shaft and is mounted to a side panel of the drawer on a back portion of the drawer in a space formed by the housing to one side of the drawer, and the screw shaft is fixedly mounted to a rear of the housing and extends forwardly an entire length of the space through the motor threaded shaft to the housing front, the internally threaded shaft rotating over the screw shaft to move the motor forwardly and rearwardly over the screw shaft to open and close the drawer.

5. The public terminal receptacle of claim 1 further including means to detect a modem carrier signal so as for controlling the motor to open and close the drawer in response to the detection of a removal of the carrier signal.

6. The public terminal receptacle of claim 1 further including a transparent cover in the drawer covering the terminal and having an opening therein so that the keyboard is accessible if the drawer is open.

7. The public terminal receptacle of claim 1 further including a limit switch mounted to a rear of the housing, the limit switch being contacted and opened when the drawer reaches its closed position so that the motor is shut off.

8. The public terminal receptacle of claim 1 further including a current sensor which senses an increased current flow to the motor and shuts the motor off when the drawer reaches its open position.

9. The public terminal receptacle of claim 1 which is telephonically linked to the public telephone such that when a call is made to another telephone having an electronic device which communicates back an answer signal, an electronic signal activates the motor to open the drawer.

10. The public terminal receptacle of claim 1 which is telephonically linked to the public telephone such that when a user presses a selected touch-tone telephone key sequence on the publc telephone, an electronic signal activates the motor to open the drawer.

11. The public terminal receptacle of claim 1 which is telephonically linked to a public telephone such that when a user inserts a special type of credit card into the telephone, an electronic signal activates the motor to open the drawer.

12. The public terminal receptacle of claim 1 wherein the drawer includes a drawer front, a back, and two side panels which join together, the two side panels each having an outwardly opening channel which extends between the drawer front and the back of the drawer, and the housing includes a housing front, a rear, and two members which each have a channel that extends between the housing front and the rear of the housing and opens adjacent to and toward the corresponding drawer channel to therewith form a pair of opposed channels having a narrow space therebetween, the public terminal receptacle further including at least one bearing located within each of the two narrow spaces, the bearings enabling the drawer to slide forwardly and rearwardly in relation to the housing.

13. The public terminal receptacle of claim 12 wherein the channels have a V-shaped cross-section.

14. The public terminal receptacle of claim 12 wherein the housing members each include a housing bearing stop which each extends vertically in one channel to divide that channel into a small front part and a large rear part, the housing bearing stops each maintaining a front bearing permanently in the small front part of each housing channel, so the drawer channels move over the front bearing sets as the drawer opens and closes; and the drawer side panels each include a drawer bearing stop which each extends vertically in one channel to divide that channel into a large front part and a small back part, the drawer bearing stops each maintaining a back bearing permanently in the back part of each drawer channel so the back bearings move through the large rear portions of the housing channels, thereby supporting a back portion of the drawers as the drawer opens and closes.

15. The public terminal receptacle of claim 1 wherein the drawer includes a drawer front, two side panels, a back and a rest which extends rearwardly from the drawer front and between the side panels in a forward portion of the drawer, the rest having a surface inclined downwardly in a rearward direction, the rest being adapted to support a forward portion of the terminal; and wherein the drawer further includes a drawer bottom which extends rearwardly from the drawer front between the lower edges of the side panels in the forward portion of the drawer, a back edge of the drawer bottom being adapted to support the bottom of the terminal, and being situated in relation to the rest so that the terminal bottom can rest inclined downwardly and rearwardly from the rest to the back edge of the drawer bottom.

16. The public terminal receptacle of claim 1 wherein the drawer includes a drawer front, two side panels, a back and a cover which extends rearwardly from the drawer front and between the side panels in a forward portion of the drawer, the cover being adapted to cover a forward portion of the terminal to protect and prevent a theft thereof, the cover also forming the keyboard opening.

17. The public terminal receptacle of claim 16 wherein the cover is adapted to extend over a display on the terminal, and the cover is formed from a transparent material through which the display can be viewed by the user when the drawer is in its open position.

18. The public terminal receptacle of claim 1 wherein the housing includes a top, a bottom, a housing front which forms the opening for the drawer, a rear, and two sides which are joined together to form said housing into a rectangular shape and which are formed from cast metal plate for preventing unauthorized tampering with the terminal; wherein the drawer includes a drawer front, and two side panels formed from cast metal plate, the drawer front overlapping a front face of the housing front in proximity to the opening when the drawer is closed to help prevent any prying between the drawer front and the housing front.

* * * * *